US009277802B2

(12) United States Patent
Meillan

(10) Patent No.: US 9,277,802 B2
(45) Date of Patent: Mar. 8, 2016

(54) WALL AND CEILING MOUNT FOR A FASTENING ROPE

(71) Applicant: Jean-Christophe Meillan, Ingelheim (DE)

(72) Inventor: Jean-Christophe Meillan, Ingelheim (DE)

(73) Assignee: LA SIESTA GMBH, Jugenheim (DE)

( * ) Notice: Subject to any disclaimer, the term of this patent is extended or adjusted under 35 U.S.C. 154(b) by 0 days.

(21) Appl. No.: 14/503,941

(22) Filed: Oct. 1, 2014

(65) Prior Publication Data

US 2015/0173495 A1 Jun. 25, 2015

(30) Foreign Application Priority Data

Oct. 1, 2013 (DE) ...................... 20 2013 104 457 U

(51) Int. Cl.
*F16L 3/08* (2006.01)
*A45F 3/24* (2006.01)
*A45F 3/22* (2006.01)
*A45F 3/26* (2006.01)
*F16L 3/04* (2006.01)

(52) U.S. Cl.
CPC ... *A45F 3/24* (2013.01); *A45F 3/22* (2013.01); *A45F 3/26* (2013.01); *F16L 3/04* (2013.01)

(58) Field of Classification Search
CPC ............... A45F 3/22; A45F 3/24; A45F 3/26; A63B 69/0048; F16L 3/04; F16G 11/14; F16G 11/046; Y10T 24/3916; Y10T 14/47; Y10T 24/47; Y10T 24/39; B62J 2009/0046
See application file for complete search history.

(56) References Cited

U.S. PATENT DOCUMENTS

| 317,350 | A | * | 5/1885 | Hasskarl | 24/129 R |
| 346,390 | A | * | 7/1886 | Thomas | 24/129 R |
| 1,284,799 | A | * | 11/1918 | Sindelar | 248/65 |
| 3,520,004 | A | * | 7/1970 | Patnaude | 4/503 |
| 4,733,835 | A | * | 3/1988 | Schlanger et al. | 248/71 |
| 4,863,135 | A | * | 9/1989 | Mellor et al. | 248/328 |
| 2014/0237774 | A1 | * | 8/2014 | Kline | 24/129 R |
| 2015/0089776 | A1 | * | 4/2015 | Meillan | 24/318 |

* cited by examiner

*Primary Examiner* — Brian Mattei
(74) *Attorney, Agent, or Firm* — Hauptman Ham, LLP

(57) ABSTRACT

A wall and ceiling mount for receiving a fastening rope, the mount comprising screw receptacles for the wall and ceiling fastening, a receiving opening for the introduction of the fastening rope, and a fastening region for the releasable fastening of the rope. The receiving opening is arranged on the lower side between two screw receptacles and is spanned by a curved connecting region. The outlet opening in the rope guide running in the wall and ceiling mount being arranged frontally and approximately centrally on the wall and ceiling mount, and, above said outlet opening. A further screw receptacle forming a fastening region on which the loop end rests, a mount at said fastening region securing the loop end which is layable releasably thereon.

8 Claims, 3 Drawing Sheets

WALL AND CEILING MOUNT FOR A FASTENING ROPE

The invention relates to a wall and ceiling mount for a fastening rope to which a body which is to be suspended is fastened.

It is becoming increasingly popular in the domestic sphere and also indoors and in the garden to releasably fasten objects by means of fastening ropes. For example, it can be increasingly found that hammocks or else hanging seats are fastened not only to and between trees, but also inside rooms in order thus to be able to enjoy said sitting and reclining devices in the domestic environment too. Awnings which in the meantime are also fastened releasably on houses as an alternative to the widely used arrangement of blinds are a further example.

It is well known also to arrange hammocks in rooms on special hammock stands, but this involves comparatively bulky items of furniture, the construction and removal of which are rather complicated. In addition, hanging seats which are suspended, for example, on a ceiling hook are also becoming increasingly popular in the domestic sphere.

It should basically be taken into consideration that, specifically for hammocks or else hanging seats, the fastening means have to support severe weight loads, and therefore particular requirements have to be imposed here on fastening means. Fastenings are widely used where fastenings are realized merely using commercially available hooks plugged into the wall and eyes, the fastenings taking place, for example, by means of spring hooks on said wall fastenings. Since, however, these involve fastening means which cannot easily be removed without further ado, consideration has already been given to designing special fastening means for wall and ceiling mounts of this type.

DE 202011105042 U1 discloses a wall and ceiling mount for hammocks and hanging seats that is specially designed for this purpose and is mounted onto the wall or ceiling by means of screw fastenings. A solution is presented here, in which the rope can be guided through the wall mount with a retaining loop which is then guided through to the wall behind the wall mount and placed over a fastening body. If said fastening rope is then subjected to tensile forces, said sling pulls on the fastening body and thereby fastens the rope structure to the wall mount.

However, it has been shown in practice that said wall mount is still afflicted with a number of disadvantages. Firstly, it is complicated to fasten a wall mount having 4 screw connections, since this requires a high level of installation complexity. In addition, in the case of the solution disclosed here, provision is made to arrange a receptacle for the loop end of the rope centrally on the wall mount, wherein the loop end is introduced into the wall mount and can be pushed in the latter through a guide channel in the region behind and above the wall mount. Problems here include the fact that the guide opening provided in the wall mount and the corresponding guide channel are of narrow design and pushing and introducing the loop and within said channel is laborious. Finally, it has proven to be a problem that the loop end which is pushed behind the wall mount then has to be placed over the upwardly pointing fastening body from the rear to the front.

This has the effect that the tensile forces which are transmitted by the loop to the wall mount when the fastening rope is subjected to a load act in their entirety upon said fastening member and pull the latter toward the wall. However, the fastening member is a body which merely has a narrow transition region to the wall mount, and therefore the weight loading of said fastening body is limited. That is to say, above a certain weight loading, the material here is too weak and the fastening body itself is deformed toward the wall and may be broken off.

Against this background, it is the object of the present invention to provide a wall and ceiling mount, in particular for hammocks and hanging seat arrangements, which wall and ceiling mount can firstly be easily attached to the wall, and at the same time permits easy handling during the fastening of a loop end of a fastening rope to said wall mount and, in addition, can absorb strong loads under tension. In addition, the intention is to ensure that the wear to the loop end of the rope via the wall mount is kept low.

This is achieved by a wall and ceiling mount having the features of Claim 1. The subsequent dependent claims relate to advantageous refinements of the invention.

The wall and ceiling mount according to the invention differs here in a plurality of structural features from the wall and ceiling mount known in the prior art. In this case, the most essential structural change is that, in contrast to the prior art, the cable end is now not introduced centrally into the wall mount, but rather is introduced into the wall mount by a receptacle opening in a curved manner on the lower side of the wall mount, and re-emerges here centrally from the wall mount. This is precisely the opposite to the arrangement of the rope in the prior art, in which the free rope loop end is introduced centrally and led out again on the upper side toward the wall.

The loop end now re-emerging centrally from the wall mount can therefore, firstly, be more easily grasped than was possible in the prior art. In the prior art, the cable had to be guided along upward somewhat laboriously between wall and wall mount, wherein the gap between the wall and wall mount had very narrow dimensions, and therefore even a supporting grasping of the rope from above was possible only with difficulty. There is now a wide channel guide within the wall mount, wherein the frontally emerging loop end can easily be grasped by the user and therefore the guiding of the rope through the wall mount can be assisted.

Since the loop end now exits, according to the invention, on the front side and centrally from the wall and ceiling mount, the guiding and fastening of said loop end to the wall and ceiling mount has also changed. In the prior art, the free loop end was placed over a fastening body and tightened from the rear side of the wall and ceiling mount to the front toward the user. The direction of pulling the loop placed around said fastening body was therefore directed from the user toward the wall, wherein the formation of the fastening body in said direction was readily possible.

The wall and ceiling mount according to the invention is now constructed in such a manner that the loop end is placed over a fastening region from the front side of the wall and ceiling mount, wherein it has to be ensured that the loop end can no longer slide away from said fastening position, for which purpose a hook-shaped retaining lug is provided on the fastening region. A central improvement of the invention here is that a pulling action on a fastening body, as has taken place in the prior art, no longer takes place in the wall mount now present. On the contrary, the loop is placed onto the fastening region of the wall and ceiling mount from the front, said fastening region at the same time serving as a receptacle for the third screw fastening.

This association of the function of the fastening region for the rope loop with the receptacle of the screw brings about an additional stabilization of the wall mounts. The pulling direction of the loop section acting on the wall mount is now no longer directed at a fastening body, but rather leads downward parallel to the wall or ceiling, wherein the forces can therefore be fully absorbed by the retaining screws fastened in the wall mount.

This fastening region of the wall mount does indeed have an approximately hook-shaped retaining lug which, however, is intended merely to fix the loop end in its position. It is a substantial difference from the prior art that said hook-shaped retaining lug has to absorb only very small, laterally acting forces, since the pulling direction of the rope or of the loop end is not directed toward said hook-shaped element, but rather runs parallel to the surface of the wall and ceiling mount and therefore to the fastening wall or ceiling. The problem of the tensile loading on a fastening body which may break off from the mount under too great a load is therefore completely solved in this novel construction. As far as the possible weight loading is concerned, the novel wall and ceiling mount is therefore primarily dependent on the plugged joint and the structure of the wall or ceiling supporting said plugged joint, and no longer on the load-bearing capacity of the wall and ceiling mount itself.

The fastening region in which the rope loop rests expediently has at least one depth which corresponds to the thickness of the rope to be laid thereon. At the same time, the hook-shaped retaining lug is intended likewise to have at least one height, starting from said fastening region, that ensures that the rope which is laid thereon cannot readily slide away. In an expedient embodiment, said height corresponds approximately to the rope thickness used, wherein the retaining lug is designed in such a manner that it engages over the rope loop on the upper side, i.e. the rope loop is inserted into the resulting, approximately U-shaped receptacle.

In an advantageous refinement of the wall and ceiling holder, the wide receptacle for the introduction of the loop-like end of the rope is located on the lower side of the wall and ceiling holder. Said receptacle is laterally bounded by receptacles in the wall and ceiling mount for two lower fastening screws, wherein a stably designed, approximately curved connecting region between said screw receptacles spans the receptacle for the loop end. It is expedient here to form said curved section of the wall and ceiling mount as an element which is of strong design, since said structural element, depending on the course of the rope, absorbs the main load of the tensile forces when attached to a vertical wall and in particular when attached to horizontally extending building ceiling. This is provided in particular in the case of a ceiling suspension, since this region then serves as a deflecting region for the fastened rope from the horizontal course in the wall and ceiling mount toward the vertical course to the suspended object.

The subject matter of the invention will be described in more detail below with reference to a plurality of drawings, in which FIG. 1 shows the wall and ceiling mount with an inserted loop end of a fastening rope in the use state;

Figure 1:
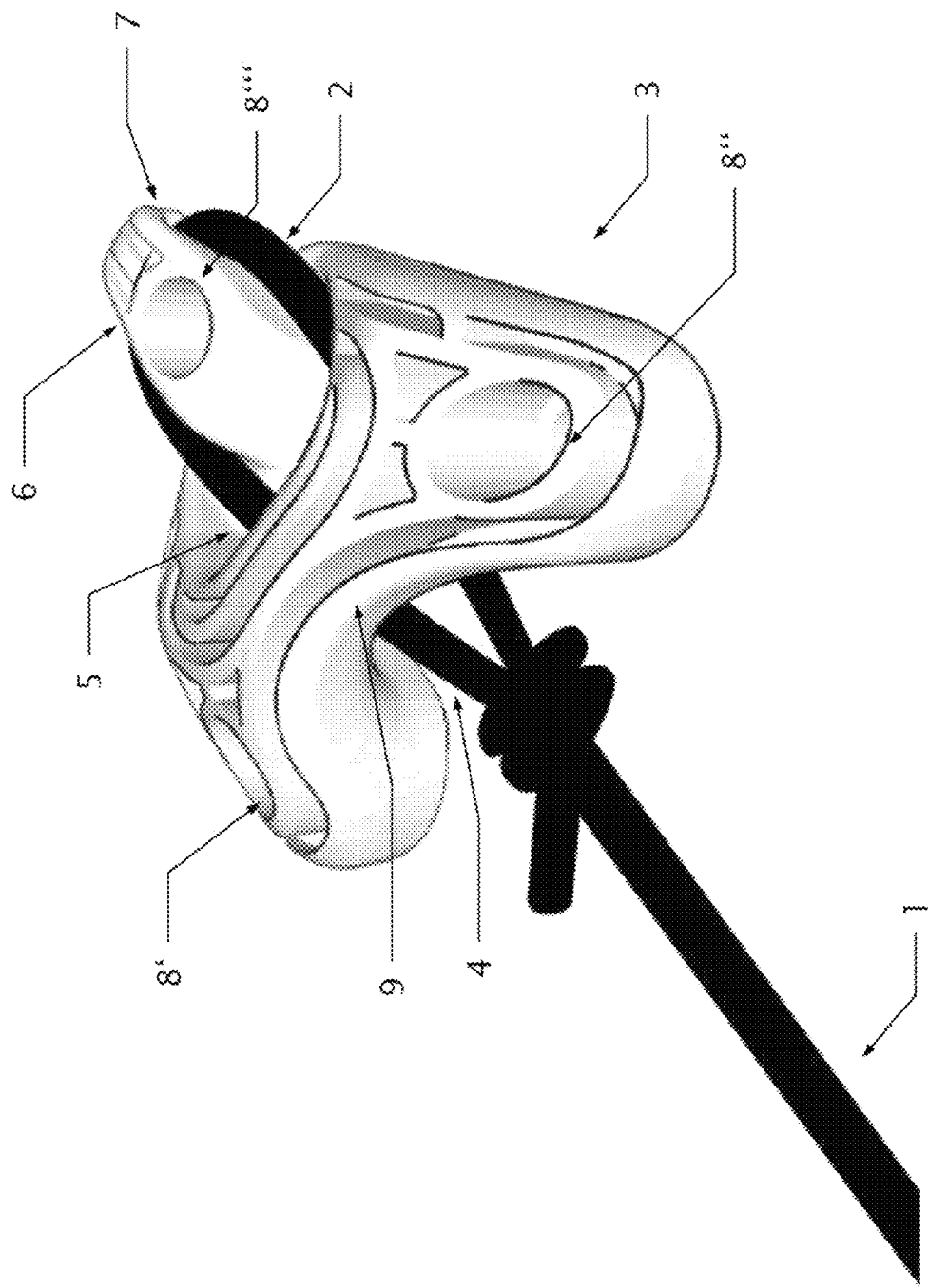

The figures accordingly show the wall and ceiling mount from various perspectives. FIG. 1 is shown here to illustrate the application situation with an introduced rope. It can be seen here that the rope 1 which is to be fastened has, at its free end, a loop 2 with which said rope 1 can be suspended on the wall and ceiling mount.

For this purpose, the wall and ceiling mount 3 has a wide receiving opening 4 through which the loop end 2 is introduced into the wall. Accordingly, the loop end 2 enters on the lower side into the wall mount 3 and is then pushed in a guide channel through the wall mount to the outlet opening 5 and thus re-emerges centrally from the wall mount. The loop end 2 is then placed over a fastening region 6, for which purpose said loop end is guided over a retaining lug 7 and laid onto the fastening region 6.

In the present structural form, the wall and ceiling mount 3 here has three receptacles 8 for fastening screws, wherein said receiving regions are selected in such a manner that an ideal support of the wall mount takes place during the force absorption due to the tensile loading of the rope.

Figure 4:
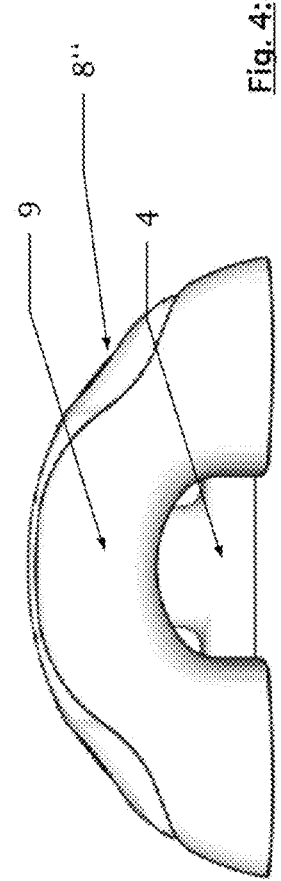
FIG. 4 shows the wall and ceiling mount in a lower view.

There are firstly in this case the screw receptacles 8' and 8'' which are arranged to the side of the receiving opening 4 for the loop end 2. Extending from said regions is a curved connecting region 9 which forms the receiving opening 4 together with the fastening regions of the screws. It is apparent here, in particular from FIG. 4, that said region is of curved design and the opening here is formed from the lateral walls of the screw receptacles 8' and 8'' and the curved connecting region 9 and the rear wall. That is to say, the guide channel 10 for the rope loop 2 is formed by the fastening wall or ceiling, with it alternatively also being possible for a rear wall to be arranged on the wall and ceiling mount 3 in this region.

Figure 2:
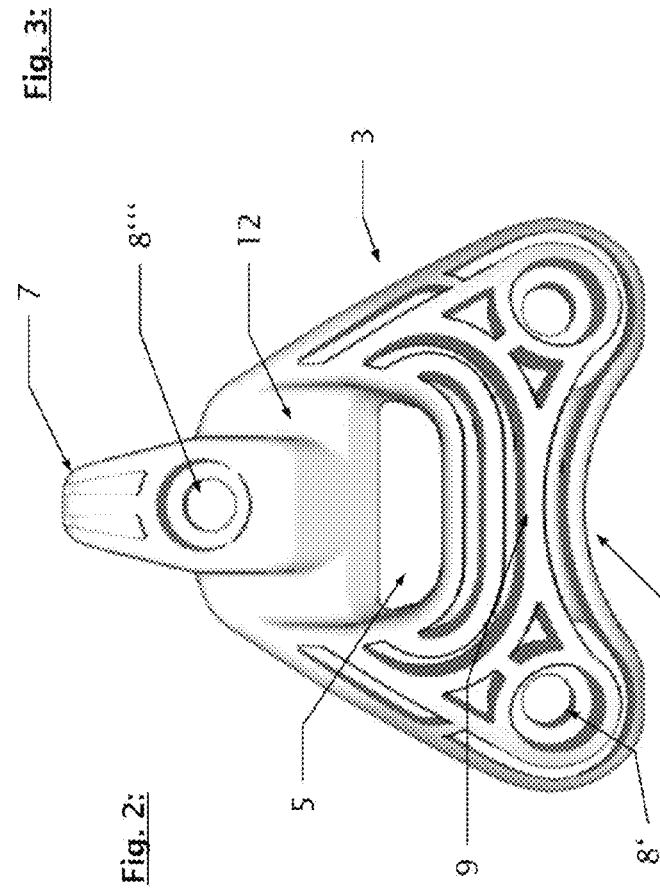
FIG. 2 shows the wall and ceiling mount in a frontal view.

FIG. 2 illustrates, in the frontal view, the arrangement of the screw receptacles 8 in a triangular arrangement. The two lower screw receptacles 8' and 8'', which lie on one level, are arranged here to the side of the receptacle 4 for the rope end 2. The outlet opening 5 for the loop end 2 is illustrated in the center of the wall and ceiling mount 3, said outlet opening likewise being of wide design, in order to permit easy introduction and grasping of the loop end 2 by the user. Located above said outlet opening 5 is the fastening region 6 for the loop end 2, said fastening region leading on the upper side into a retaining lug 7.

Figure 3:
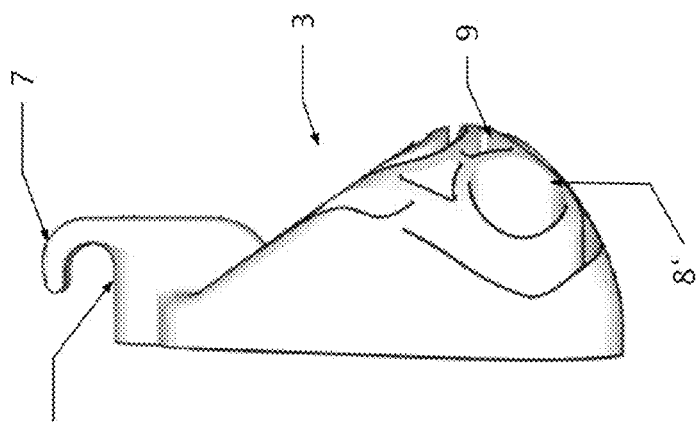
FIG. 3 shows the wall and ceiling mount in a lateral view.

Said retaining lug 7 is illustrated in a lateral view in FIG. 3 with the fastening region 6. The loop end 2 accordingly emerges centrally from the outlet opening 5 of the wall and ceiling mount 3 and is laid over the retaining lug 7. In the embodiment present here, the retaining lug 7 is of approximately U-shaped design, as a result of which the inserted loop end 2 is retained both in the vertical direction and in the horizontal direction.

However, it is clearly apparent here from FIG. 3 in conjunction with FIG. 1 that the retaining lug 7 is not loaded by the main portion of the tensile force of the rope 1, since the pulling direction of the rope 1 on the loop end 2 runs parallel to the fastening wall and is therefore conducted directly into the fastening region 6 of the wall and ceiling mount 3 without the retaining lug 7 having to support relatively large forces. In particular in the arrangement as a wall mount, the tensile forces are therefore conducted primarily parallel to the wall into the screws guided in the upper screw receptacle 8'''.

Figure 6:
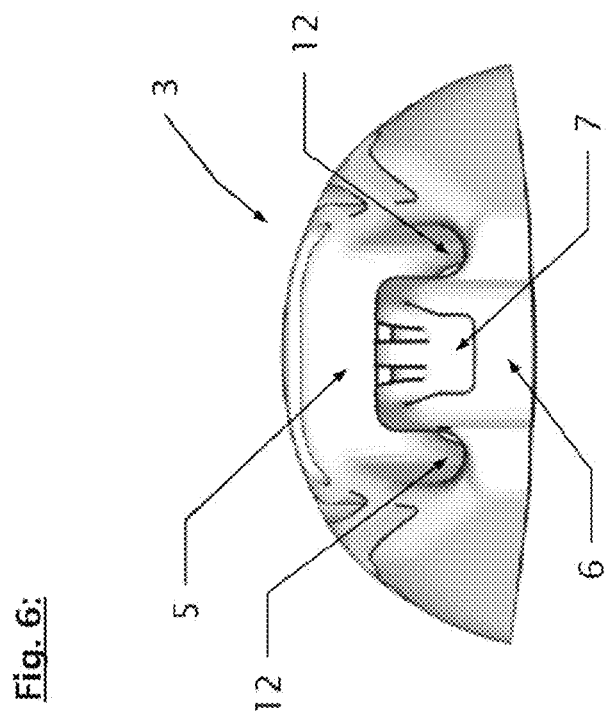
FIG. 6 shows the wall and ceiling mount in a top view.

It is apparent from FIG. 3 and FIG. 6 that a gap is formed between the retaining lug 7 and the fastening wall, into which the loop end 2 is lifted in order to come to rest on the fastening region 6. It is thereby ensured that the loop end 2 cannot unintentionally slide away from the fastening region 6 of the wall and ceiling mount 3.

Figure 5:
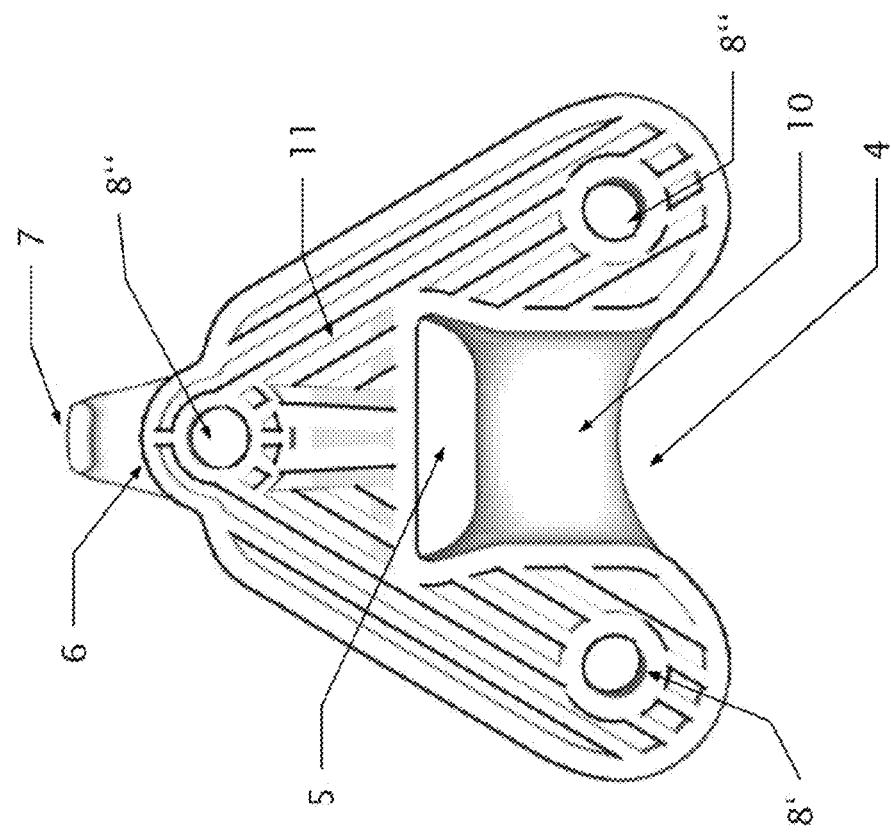
FIG. 5 shows the wall and ceiling mount in a rear view.

Finally, FIG. 5 illustrates the course of the guide channel 10 in the wall and ceiling mount 3. It is apparent that the central region of the wall-mount rear surface 11, which is provided with stiffening strips and bears flat against the wall, has a cutout which is spanned by the curved connecting region 9. The receptacle is arranged here on the lower side between the screw receptacles 8' and 8'' and, together with the fastening wall (not illustrated), forms a guide channel 10 which leads into an outlet opening 5 in the center of the wall mount. The loop end introduced here can then be laid over the retaining lug 7 onto the fastening region 6, which is secured centrally by a fastening screw in the receptacle 8'''. In particular, said screw guidance in the fastening region 7 through the receptacle 8''' makes an elemental contribution to the stabilization of the wall and ceiling mount 3.

It is illustrated here in the lateral illustration of FIG. 3 that the screw receptacle 8''' is arranged in a significantly projecting manner on the wall and ceiling mount 3 above the outlet opening 5 in order to have a depth and stability which can form the fastening region 6. The result of this is that set-back guide regions 12 run laterally next to said screw receptacle 8''', which forms the fastening region 6, in which guide regions the rope sections forming the loop end 2 run.

The invention claimed is:

1. A wall and ceiling mount (3) for receiving a fastening rope (1), comprising screw receptacles (8) for the wall and ceiling mount (3), a receiving opening (4) for the introduction of the fastening rope (1), and a fastening region (6) for the releasable fastening of the rope (1), wherein the receiving opening (4) is arranged on a lower side between two screw receptacles (8' and 8") of the screw receptacles and is spanned by a curved connecting region (9), an outlet opening (5) in a rope guide running in the wall and ceiling mount (3) being arranged frontally and approximately centrally on the wall and ceiling mount (3), and, above said outlet opening (5), a further screw receptacle (8''') of the screw receptacles forming a fastening region (6) on which a loop end (2) rests, a mount at said fastening region (6) securing the loop end (2) which is layable releasably thereon.

2. The wall and ceiling mount as claimed in claim 1, wherein the rope guide (10) in the wall and ceiling mount (3) is formed by the lateral walls of the lower screw receptacles (8' and 8"), the curved connecting region (9) and a fastening wall or fastening ceiling supporting the wall and ceiling mount (3).

3. The wall and ceiling mount as claimed in claim 1, wherein the rope guide (10) in the wall and ceiling mount (3) is formed from the lateral walls of the lower screw receptacles (8' and 8"), the curved connecting region (9) and a wall-mount rear surface (11).

4. The wall and ceiling mount as claimed in claim 1, wherein the further screw receptacle (8''') is designed to protrude in relation to the outlet opening (5) and thus forms a rest for the fastening region (6) for the loop end (2), as a result of which guide regions (12) which are set back in relation to the protruding screw receptacle (8''') laterally on both sides thereof are formed for the loop end (2).

5. The wall and ceiling mount as claimed in claim 1, wherein the fastening region (6) formed by the further screw receptacle (8''') is placed in terms of its depth in front of the outlet opening (5) at least by the diameter of a rope thickness maximally provided for the wall and ceiling mount (3).

6. The wall and ceiling mount as claimed in claim 1, wherein the mount for the loop end (2) on the fastening region (6) is designed as a retaining lug (7).

7. The wall and ceiling mount as claimed in claim 6, wherein the retaining lug (7) is designed as a body engaging in a U-shaped manner around the loop end (2), wherein the retaining lug (7) is at a distance from the rear fastening surface (11) of the wall and ceiling mount (3) and therefore the retaining lug (7) together with a resting surface of the fastening wall or fastening ceiling forms a receiving gap for the insertion of the loop end (2).

8. The wall and ceiling mount as claimed in claim 1, wherein the mount for the loop end (2) on the fastening region (6) is designed as a groove.

\* \* \* \* \*